(12) United States Patent
Johnston (10) Patent No.: US 8,272,393 B2
(45) Date of Patent: Sep. 25, 2012

(54) SWITCHOVER VALVE

(75) Inventor: Ronald J. Johnston, Welington, OH (US)

(73) Assignee: Superior Products, Inc., Cleveland, OH (US)

( * ) Notice: Subject to any disclaimer, the term of this patent is extended or adjusted under 35 U.S.C. 154(b) by 860 days.

(21) Appl. No.: 12/261,503

(22) Filed: Oct. 30, 2008

(65) Prior Publication Data

US 2009/0107560 A1  Apr. 30, 2009

Related U.S. Application Data

(60) Provisional application No. 60/983,705, filed on Oct. 30, 2007.

(51) Int. Cl.
| G05D 11/00 | (2006.01) |
| E03B 7/07 | (2006.01) |
| F16K 37/00 | (2006.01) |
| F17D 3/00 | (2006.01) |

(52) U.S. Cl. ............ 137/113; 137/554; 137/557
(58) Field of Classification Search ............ 137/113, 137/112

See application file for complete search history.

(56) References Cited

U.S. PATENT DOCUMENTS

| 2,641,273 | A | 6/1953 | Siebens |
| 2,985,185 | A | 5/1961 | Morehead et al. |
| 3,001,541 | A | 9/1961 | St. Clair |
| 3,131,708 | A * | 5/1964 | Knight ............ 137/113 |
| 3,642,020 | A * | 2/1972 | Payne ............ 137/112 |
| 3,658,081 | A | 4/1972 | Renaudie |
| 4,281,677 | A * | 8/1981 | Hoffman ............ 137/113 |
| 4,889,152 | A | 12/1989 | Wilson |
| 5,014,733 | A | 5/1991 | Wilson |
| 6,196,252 | B1 * | 3/2001 | Martin et al. ............ 137/102 |
| 6,296,008 | B1 | 10/2001 | Boyer et al. |
| 6,450,217 | B2 | 9/2002 | Mutter |
| 6,662,819 | B1 | 12/2003 | Watson |
| 6,792,965 | B2 * | 9/2004 | Kunkler ............ 137/113 |

* cited by examiner

*Primary Examiner* — Dinh Q Nguyen
*Assistant Examiner* — Chee-Chong Lee
(74) *Attorney, Agent, or Firm* — Pearne & Gordon LLP (57) ABSTRACT

A valve provides automatic switchover from a plurality of fluid pressure sources to a common outlet. The valve includes first and second spools respectively in first and second spool chambers, and each spool includes at least one sealing member carried thereon for selective sealing engagement with said first and second spool chambers. Fluid passageways transfer spool controlled fluid pressures between the first and second spool chambers. Each of said first and second spools are resiliently biased towards an open position, and fluid-biased towards a closed position. In an open position, the first and second spools are adapted to deliver pressurized fluid from an associated inlet port to an end chamber of the opposite spool chamber. In a closed position, the first and second spools are adapted via the at least one sealing member to inhibit delivery of pressurized fluid. A manifold assembly provides fluid communication to the common outlet.

21 Claims, 7 Drawing Sheets

SWITCHOVER VALVE

CROSS-REFERENCE TO RELATED APPLICATIONS

This application claims the benefit of U.S. Provisional Application No. 60/983,705, filed Oct. 30, 2007, the entire disclosure of which is hereby incorporated herein by reference.

FIELD OF THE INVENTION

The present invention pertains generally to a switchover manifold for receiving two or more pressurized flows and automatically selecting one flow for discharge.

BACKGROUND OF THE INVENTION

Pressurized gas cylinders are used to supply gas for numerous commercial, industrial and consumer applications. With a single cylinder connected to supply gas, when the cylinder is empty the supply of gas must be temporary stopped until the cylinder can be replaced. This can lead to lost productivity while the cylinder is being changed.

To overcome this problem, devices have been proposed which allow more than one cylinder to be connected to a switchover manifold which automatically switches the flow of gas to a backup cylinder when the pressure of a cylinder drops below a switchover threshold.

One example of an automatic switchover device is shown and described in U.S. Pat. No. 5,014,733 to Wilson ("Wilson"), which is incorporated by reference herein. In the device described by Wilson, two cylinders are each connected to supply gas pressure to a spool. Each spool acts as a pressure-sensitive valve that is biased to an open position by a spring. Pressurized gas from a first cylinder is directed in sequence through a first spool in the open position to an end chamber of a second spool causing it to close, thereby shutting off the flow from the second cylinder. When the pressure in the first cylinder drops below a predetermined level, the second spool is allowed to move into the open position by the drop in pressure at its end chamber. This allows gas to flow from the second cylinder through the second spool into an end chamber of the first spool, causing it to move into the closed position, thereby shutting off the flow from the first cylinder and permitted it to be disconnected and replaced. A flow separator spool is provided at the outlet of the device to serve as a check valve.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a valve for automatic switchover from a plurality of fluid pressure sources to a common outlet is provided. The valve includes a valve body including first and second inlet ports in fluid communication with first and second spool chambers, respectively. Each of said first and second inlet ports are adapted for fluid communication with respective fluid pressure sources, and each of said first and second spool chambers include an end chamber. The valve further includes first and second spools respectively in said first and second spool chambers and each including at least one sealing member carried thereon for selective sealing engagement with a portion of said first and second spool chambers, respectively. Each of said first and second spools are resiliently biased towards an open position, and fluid-biased towards a closed position. The valve further includes fluid passageways extending through said valve body receiving spool controlled fluid pressures and each terminating at the end chamber of said first and second spool chambers. In an open position, each of said first and second spools are adapted to provide delivery of pressurized fluid from an associated one of the inlet ports to the end chamber of the opposite spool chamber. In a closed position, each of said first and second spools are adapted via the at least one sealing member to inhibit delivery of pressurized fluid from an associated one of the inlet ports to the end chamber of the opposite spool chamber. The valve further includes a manifold assembly including at least one manifold bore in fluid communication with each of the end chambers and the common outlet. The manifold assembly includes first and second manifold spools moveable within said at least one manifold bore between open and closed positions for alternatively providing fluid communication between one of said end chambers and the common outlet while inhibiting fluid communication between the other of said end chambers and the common outlet.

In accordance with another aspect of the present invention, a valve is provided for automatic switchover from a plurality of fluid pressure sources to a common outlet. The valve includes a valve body including first and second inlet ports in fluid communication with first and second spool chambers, respectively. Each of said first and second inlet ports are adapted for fluid communication with respective fluid pressure sources, and each of said first and second spool chambers include a primary chamber, a secondary chamber, and an end chamber. The valve further includes first and second spools respectively in said first and second spool chambers and each including at least one sealing member carried thereon for selective sealing engagement with a portion of said first and second spool chambers to selectively inhibit fluid communication between said primary and secondary chambers, respectively. Each of said first and second spools are resiliently biased towards an open position wherein said primary chamber is in fluid communication with said secondary chamber, and fluid-biased towards a closed position wherein said primary chamber is inhibited from fluid communication with said secondary chamber via said at least one sealing member. The valve further includes fluid passageways extending through said valve body receiving spool controlled fluid pressures. The fluid passageways each begin at the secondary chamber one of said first and second spool chambers and terminate at the end chamber of the opposite spool chamber. In an open position, each of said first and second spools are adapted to provide delivery of pressurized fluid from an associated one of the inlet ports to the end chamber of the opposite spool chamber. In a closed position, each of said first and second spools are adapted via the at least one sealing member to inhibit delivery of pressurized fluid from an associated one of the inlet ports to the end chamber of the opposite spool chamber. The valve further includes a manifold assembly including at least one manifold bore in fluid communication with each of the end chambers and the common outlet. The manifold assembly includes first and second manifold spools moveable within said at least one manifold bore between open and closed positions for alternatively providing fluid communication between one of said end chambers and the common outlet while inhibiting fluid communication between the other of said end chambers and the common outlet.

In accordance with another aspect of the present invention, a valve is provided for automatic switchover from a plurality of fluid pressure sources to a common outlet. The valve includes a valve body including first and second inlet ports in fluid communication with first and second spool chambers, respectively. Each of said first and second inlet ports are adapted for fluid communication with respective fluid pressure sources, and each of said first and second spool chambers include a primary chamber, a secondary chamber, and an end chamber. The valve further includes first and second spools respectively in said first and second spool chambers and each including a plurality of sealing members carried thereon. At least one of the plurality of sealing members selectively inhibits fluid communication between said first chambers and said secondary chambers, and at least another of the plurality of sealing members selectively inhibits fluid communication between said primary chambers and said end chambers, respectively. Each of said first and second spools are resiliently biased towards an open position, and fluid-biased towards a closed position. The valve further includes fluid passageways receiving spool controlled fluid pressures, the fluid passageways each beginning at the secondary chamber one of said first and second spool chambers and terminating at the end chamber of the opposite spool chamber. In an open position, each of said first and second spools are adapted to provide delivery of pressurized fluid from an associated one of the inlet ports to the end chamber of the opposite spool chamber. In a closed position, each of said first and second spools are adapted via said at least one of the plurality of sealing members to inhibit delivery of pressurized fluid from an associated one of the inlet ports to the end chamber of the opposite spool chamber. The valve further includes a manifold assembly including at least one manifold bore in fluid communication with each of the end chambers and the common outlet. The manifold assembly includes at least one manifold spool moveable within said at least one manifold bore between open and closed positions for alternatively providing fluid communication between one of said end chambers and the common outlet while inhibiting fluid communication between the other of said end chambers and the common outlet.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Figure 1:
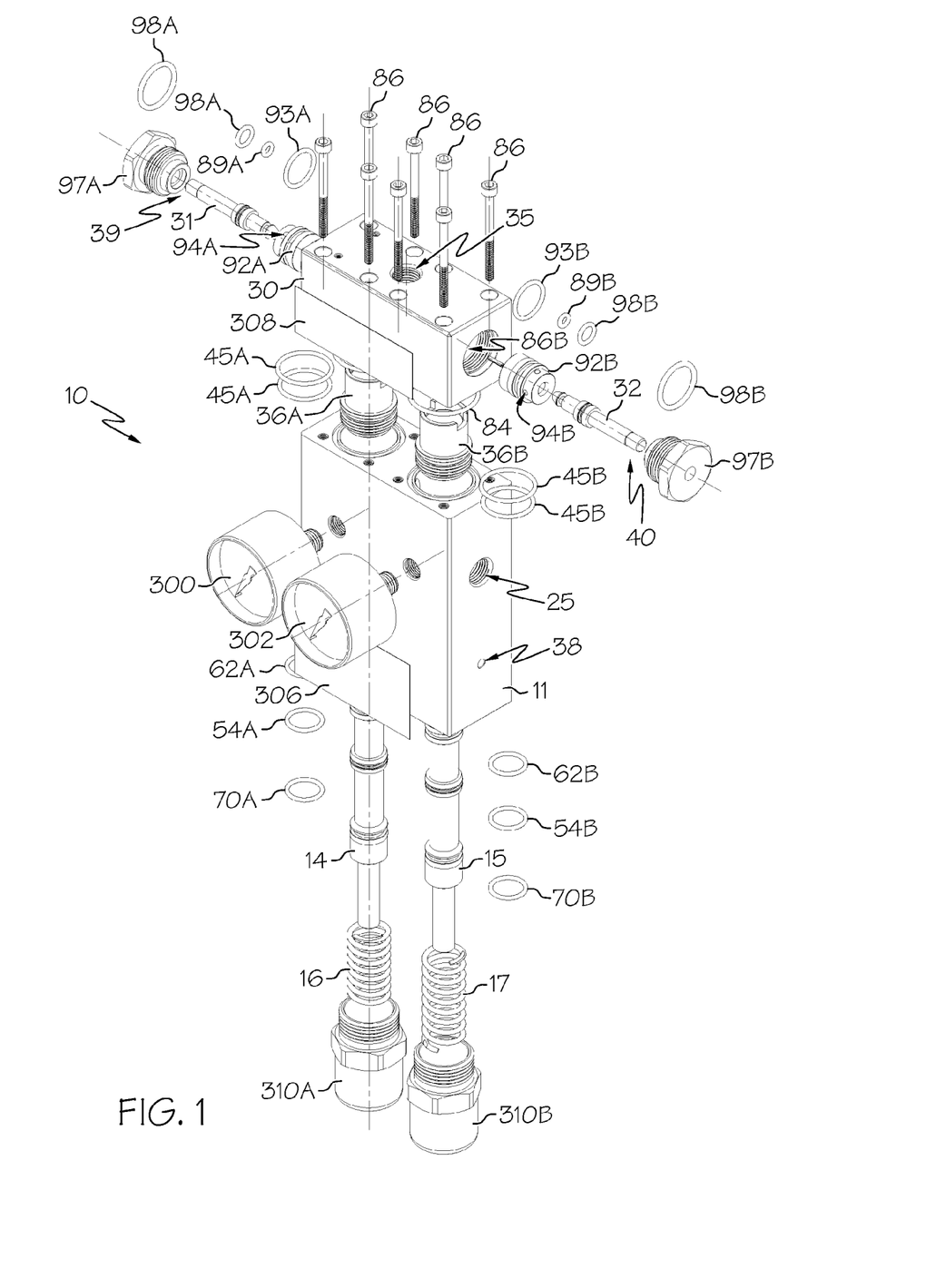
FIG. 1 is an exploded, perspective view of an example valve.

Turning to the shown example of FIG. 1, the reference numeral 10 indicates a valve for automatic switchover from a plurality of fluid pressure sources to a common outlet. The valve 10 includes a valve body 11 for incorporation into a pressure system having multiple pressure sources including various fluids (i.e., liquid, gas, etc.), such as carbon dioxide gas ($CO_2$) stored in pressure vessels, such as tanks 12, 13 (see FIG. 2) or the like, each equipped with standard outlet valves and controls (not shown). The valve 10 can be utilized with various fluid pressures, such as 500 pounds per square inch (PSI), 1000 PSI, 2000 PSI, or even 3000 PSI, though various other pressures are contemplated. It is to be understood that the valve 10 can be used with various liquids and gasses at various temperatures and pressures, such as in various pneumatic or hydraulic configurations. Indeed, the various elements of the valve 10 can be formed of generally rigid materials suitable for handling various fluids. In one example, the valve body 11 can include metals, such as brass, which may or may not be externally and/or internally coated or plated with various materials. Additionally, the valve body 11 can be monolithic, or can be formed of a plurality of elements (e.g., see FIGS. 5-6).

The valve body 11 can include at least one inlet port, such as first and second inlet ports 24, 25 in fluid communication with first and second spool chambers 28, 29, respectively. It is to be understood that while the valve 10 is described herein with reference to two spool chambers 28, 29 for switchover between two pressure sources (i.e., tanks 12, 13), the valve 10 can include various numbers of spool chambers (and associated spool valves) for switchover among various numbers of pressure sources. Additionally, either of the first and second spool chambers 28, 29 and the associated tanks 12, 13 can be utilized as a primary or secondary fluid pressure supply, depending upon which chamber 28, 29 is pressurized first.

The spool chambers 28, 29 can be formed at least partially through the valve body 11. For example, as shown, the spool chambers 28, 29 can extend completely through the valve body 11 from one end to the other. Each of the spool chambers 28, 29 can include various geometries, cross-sectional areas, lengths, features, etc. Additionally, each of the first and second spool chambers 28, 29 can include an end chamber 20, 21 located generally towards one end thereof, and/or a spring chamber 18, 19 located generally towards an opposite end thereof, though various other chambers are also contemplated. Each of the end chambers 20, 21 can further include a respective outlet 22, 23.

Each of the first and second inlet ports 24, 25 are adapted for fluid communication with respective fluid pressure sources, such as the tanks 12, 13. As illustrated, the first and second inlet ports 24, 25 can include structure for coupling to the tanks 12, 13, such as threaded connections (illustrated) and/or various quick-disconnect systems. The tanks 12, 13 can be fluidly coupled to the first and second inlet ports 24, 25 by various known methods, including pipes, hoses, etc.

The valve 10 can further include first and second spools 14, 15 disposed in the first and second spool chambers 28, 29, respectively. Each of the first and second spools 14, 15 can be resiliently biased towards an open position, such as by first and second spool springs 16 and 17 located in the spring chambers 18 and 19. The first and second spool springs 16, 17 can include various types of springs, such as coil springs, torsion springs, spiral springs, leaf springs, etc. that can be formed of various materials, and/or can be coupled to any of the valve body 11 and the spools 14, 15. Additionally, each of the first and second spools 14, 15 can also be fluid-biased towards a closed position, as will be discussed more fully herein.

Figure 4A:
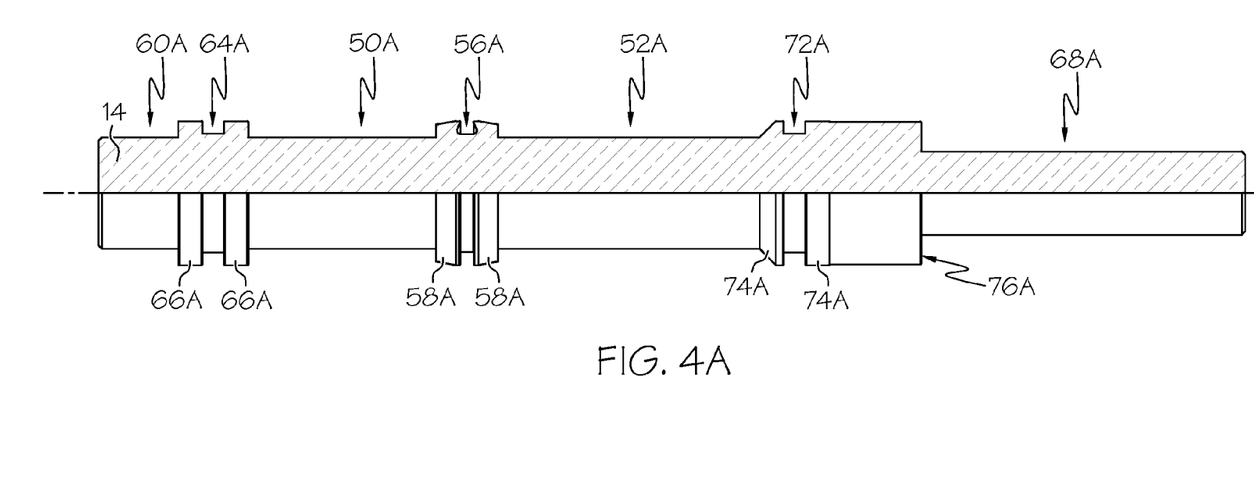
FIG. 4A is a partial sectional view of an example spool.

Turning briefly to FIG. 4A, the first and second spools 14, 15 will be discussed in further detail. It is to be understood that only the first spool 14 and associated structure is described and shown in various Figures with reference numbers denoted with an "A", though such description can apply similarly to the second spool 15 and associated structure. Indeed, similar reference numbers denoted with a "B" are provided for corresponding elements of the second spool 15 and associated structure, where illustrated.

As shown, each of the first and second spools 14, 15 are provided with a first annular groove 50A adjacent to a second annular groove 52A to direct gas pressure from an inlet port 14-15 to a connecting passageway or tube 26, 27. The first and second annular grooves 50A, 52A can extend at least partially, such as completely, about an outer perimeter of the first spool 14. The annular grooves 50A, 52A can have various geometries, and can also extend various longitudinal distances. Generally, the annular grooves 50A, 52A can define a volume generally between an outer portion of the spool 14 (i.e., grooves 50A, 52A) and the interior sidewalls of the spool chamber 28 for receiving fluid flow therebetween. Thus, each of the annular grooves 50A, 52A can generally define primary and secondary chambers 80A, 82A within the first spool chamber 28.

Figure 2:
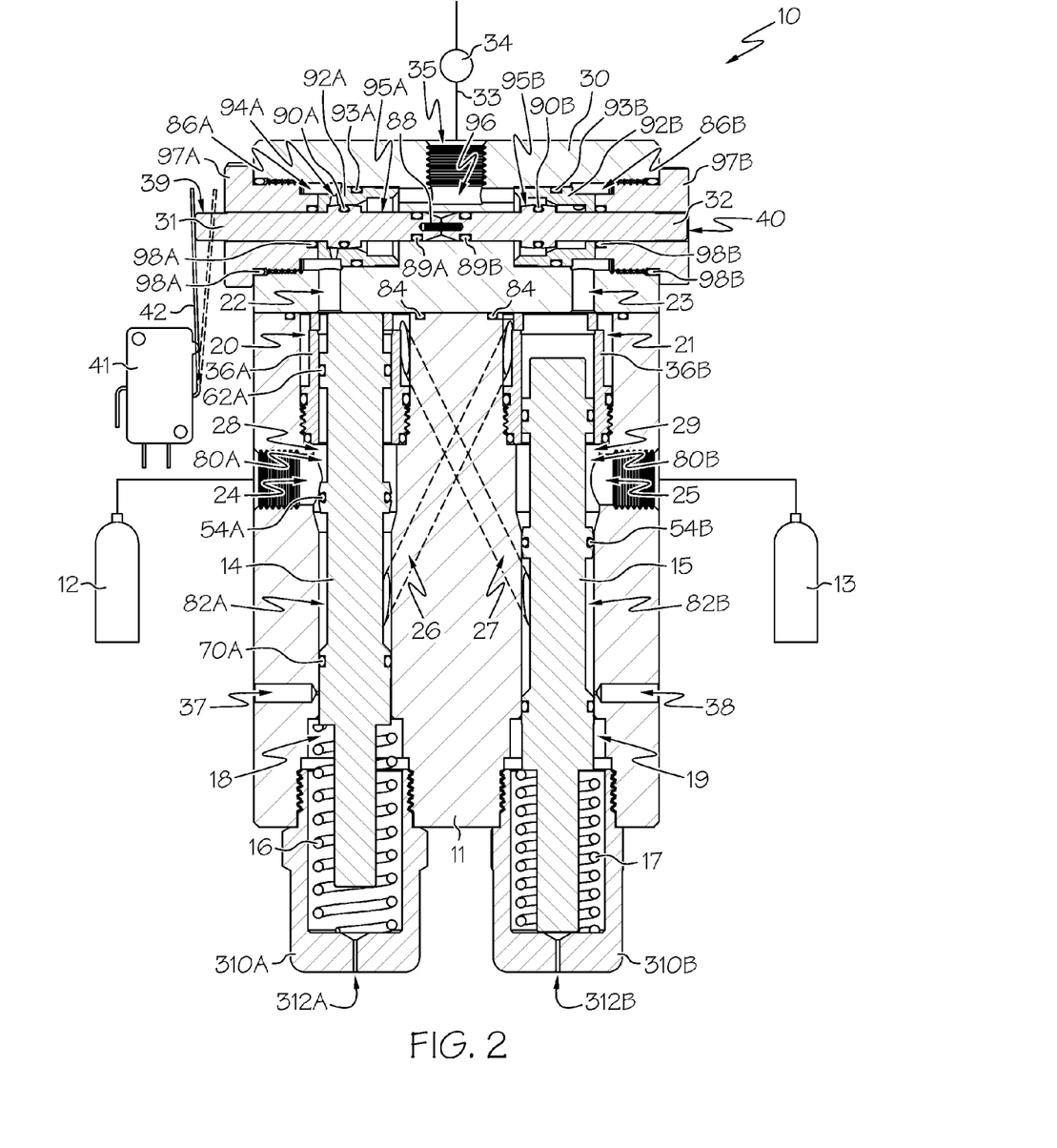
FIG. 2 is a sectional view of the example valve of FIG. 1 showing example spools in one example configuration with an example manifold.

The first and second annular grooves 50A, 52A can be separated by at least one sealing member 54A carried on the spool 14 for selective sealing engagement with a portion of said first spool chamber 28. As illustrated in FIG. 2, the sealing member 54A can include an o-ring formed of various resilient (or even non-resilient) materials. The sealing member 54A can be maintained within an annular o-ring seat 56A defined between a pair of shoulders 58A coupled to or formed with the spool 14. The annular o-ring seat 56A can have various geometries, such as a generally U-shaped or V-shaped geometry. In another example, as shown in FIG. 4A, the annular o-ring seat 56A can have a dovetail geometry for receiving the sealing member 54A. The dovetail geometry can provide a relatively larger cross-sectional area closer towards a central axis of the spool 14, and a relatively smaller cross-sectional area further from the central axis of the spool 14. Thus, when the sealing member 54A (i.e., a resilient o-ring) is inserted into the annular o-ring seat 56A, the relatively larger cross-sectional area of the dovetail geometry can inhibit inadvertent removal (i.e., such as tearing away) of the sealing member 54A from the seat 56A, and/or can inhibit excessive compression and/or circumferential stretching of the sealing member 54A. Similarly, the dovetail geometry can inhibit backpressure formed between the sealing member 54A and the annular o-ring seat 56A from dislodging the sealing member 54A therefrom.

The spool 14 can also include various other annular grooves. For example, as shown, a third annular groove 60A can be provided generally towards one end of the spool 14 so as to correspond generally with the end chamber 20 for providing fluid flow therein. The third annular groove 60A can be separated from the first annular groove 50A by at least one sealing member 62A carried on the spool 14 for sealing engagement with a portion of said first spool chamber 28 (such as an insert, as will be discussed more fully herein). As illustrated in FIG. 2, the sealing member 62A can include an o-ring formed of various resilient materials. The sealing member 62A can be maintained within an annular o-ring seat 64A defined between a pair of shoulders 66A coupled to or formed with the spool 14.

In another example, also as shown, a fourth annular groove 68A can be provided generally towards another end of the spool 14 so as to correspond generally with the spring chamber 18 for providing fluid flow therein. In addition or alternatively, the fourth annular groove 68A can provide a suitable diameter of the spool 14 for receiving the spool spring 16 thereon, and/or for defining a shoulder 76A for engagement with the spring 16. The fourth annular groove 68A can be separated from the second annular groove 52A by at least one sealing member 70A carried on the spool 14 for sealing engagement with a portion of said first spool chamber 28. The sealing member 70A can include an o-ring formed of various resilient materials that can be maintained within an annular o-ring seat 72A defined between a pair of shoulders 74A coupled to or formed with the spool 14. Either or both of the annular o-ring seats 64A, 72A can have various geometries, such as generally U-shaped or dovetail geometries.

Figure 3:
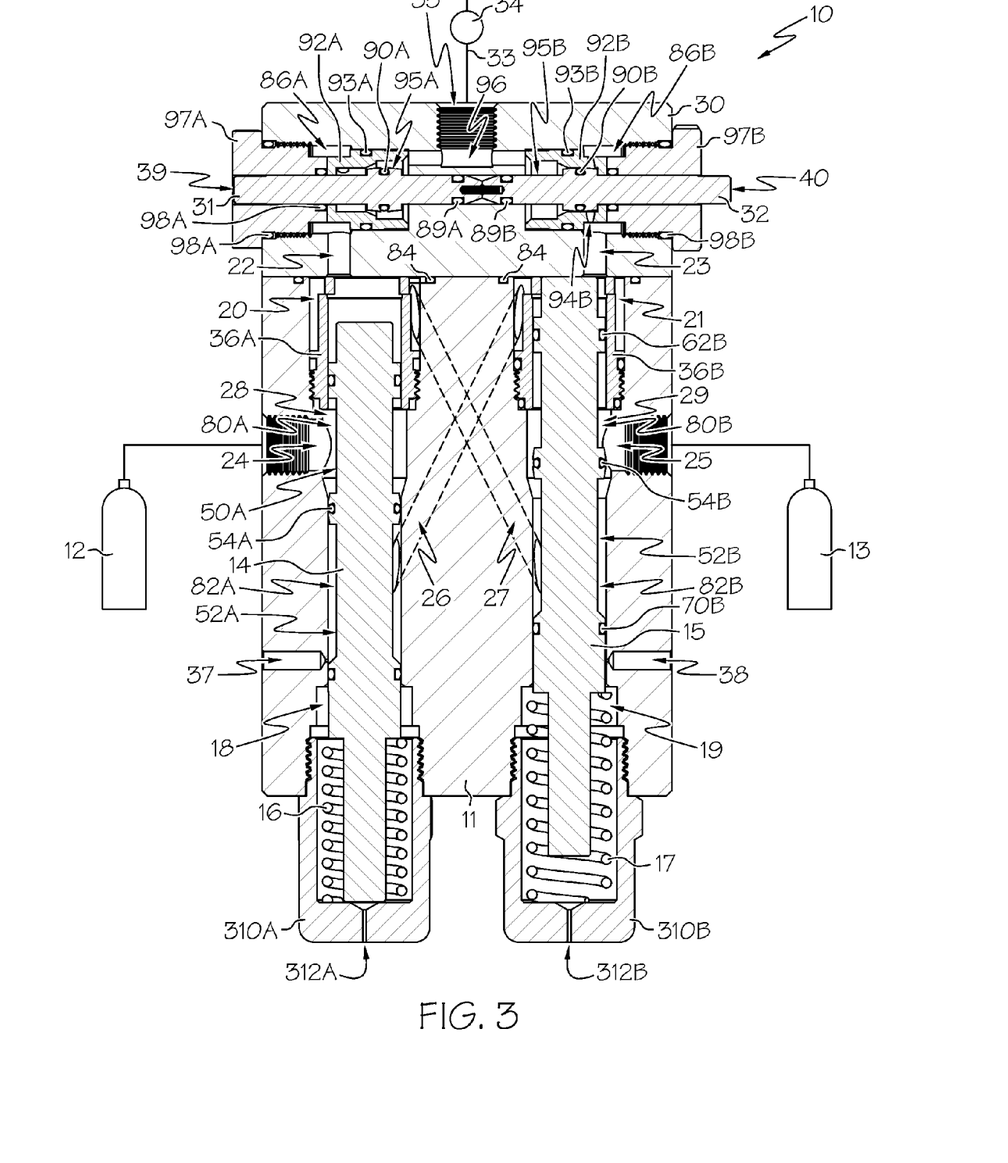
FIG. 3 is similar to FIG. 2, but shows the spools in another example configuration.

The spool chambers 28, 29 can similarly include various geometries for receiving and engagement of the spools 14, 15. For example, as shown in FIG. 2, the spool chambers 28, 29 can each include a tapered geometry extending between the primary and secondary chambers 80A, 82A of the first spool chamber 28 to facilitate sealing engagement of the sealing member 54A with a portion of the spool chamber 28. As shown in FIG. 3, the sealing member 54A can selectively seal the primary chamber 80A from the secondary chamber 82A when the sealing member 54A is in engagement with a portion of the first spool chamber 28, such as an interior wall thereof. However, because the first spool 14 is configured to translate within the first spool chamber 28, the sealing member 54A can alternatively engage and disengage the wall of the first spool chamber 28. Moreover, the engagement of the sealing member 54A with the first spool chamber 28 may occur under relatively high pressure, force, and/or speed. Thus, it can be beneficial to provide the spool chambers 28, 29 with the tapered geometry extending between the primary and secondary chambers 80A, 82A such that the sealing member 54A (i.e., an o-ring) can be eased into and out of engagement with the interior wall.

The tapered geometry can also facilitate centering of the spool 14, 15 within the spool chambers 28, 29. In addition or alternatively, the first and second spools 14, 15 can each include portions having similar tapered geometry. In addition or alternatively, various lubricants may also be used. Thus, a greater service life may be obtained from the sealing member 54A due to any or all of relatively decreased shock forces, tearing away forces, frictional forces, etc. Further, the tapered geometry of the spool chambers 28, 29 can provide an increased cross-sectional area generally about the first and second inlets 24, 25 such that the sealing members 54A, 54B can be spaced a distance therefrom. Thus, during movement of the spools 14, 15, the sealing members 54A, 54B may not contact the interior walls or edges adjacent the first and second inlets 24, 25, which may also increase the service life of the sealing members 54A, 54B. Moreover, the relatively increased cross-sectional area about the first and second inlets 24, 25 can reduce the amount that the sealing members 54A, 54B extend into and/or block the inlets 24, 25, which can relatively increase the pressurized fluid flow therethrough.

In addition or alternatively, each end chamber 20, 21 of the spool chambers 28, 29 can include an insert 36A, 36B therein. The end chambers 20, 21 can each have a relatively larger cross-sectional area than the corresponding spool chambers 28, 29 so as to provide increased volume for receiving fluid flow from the passageways 26, 27. Thus, the inserts 36A, 36B can accommodate the increased volume, while also providing a generally consistent cross-sectional area for engagement with the spool 14, 15. Indeed, the sealing members 62A, 62B of the spools 14, 15 can sealingly engage an interior portion of the inserts 36A, 36B. The inserts 36A, 36B can also act as spacers, and/or can define a flow path for the pressurized fluid between the passageways 26, 27 and the outlets 22, 23. Additionally, one or more sealing members 45A, 45B (such as o-rings or the like) can be provided between the inserts 36A, 36B and portions of the end chambers 20, 21 and/or spool chambers 28, 29.

Further, as described above, each of the connecting passageways or tubes 26, 27 serve to communicate the gas pressure to the end chambers 20, 21 of the other spool 14, 15. For example, the connecting fluid passageways 26, 27 extend through the valve body 11 for receiving spool controlled fluid pressures, and each terminate at the end chamber 20, 21 of the first and second spool chambers 28, 29. As shown, the fluid passageways can begin generally at the secondary chamber 82A, 82B of one of the first and second spool chambers 28, and terminate generally at the end chamber 20, 21 of the opposite spool chamber 28, 29. The connecting passageways 26, 27 are separated from each other, and are not in fluid communication. Though shown as overlapping in FIGS. 2-3, it is to be understood that the connecting passageways 26, 27 are spaced a vertical distance apart from each other so as to separately and discretely extend through the valve body 11. It can be beneficial to have each of the connecting passageways 26, 27 extending through the valve body 11 so as to protect them from damage and/or pressure leaks, etc. Still, either or both of the passageways may extend at least partially external of the valve body 11 (i.e., see FIG. 5)

Accordingly, each valve spool 14, 15 may, when in an open position, direct a pressure flow to the end chamber 20, 21 of the other spool 14, 15. For example, when in an open position, each of said first and second spools 14, 15 are adapted to provide delivery of pressurized fluid from an associated one of the inlet ports 24, 25 to the end chamber 20, 21 of the opposite spool chamber 28, 29. When in a closed position, each of said first and second spools 14, 15 are adapted via at least one sealing member (i.e., o-ring 54A) to inhibit delivery of pressurized fluid from an associated one of the inlet ports 24, 25 to the end chamber 20, 21 of the opposite spool chamber 28, 29.

For example, as illustrated in FIG. 2, fluid flow from tank 12 enters through the inlet port 24 and proceeds into the primary chamber 80A of the first spool chamber 28. Because the first spool 14 is spring biased to the open position, the sealing member 54A is not in engagement with the first spool chamber 28, permitting fluid flow from the primary chamber 80A to the secondary chamber 82A. Fluid flow then proceeds from the secondary chamber 82A and through the connecting passageway 26 to the end chamber 21 of the opposite, second spool 15. The third annular groove 60B of the second spool 15 generally permits flow from the end chambers 21 to the outlet 23, possibly even when the associated spool 14, 15 is in a closed position. Thus, each inlet port 24, 25 communicates the fluid pressure from one of the pressure sources or (i.e., tanks 12, 13) to the outlets 22, 23 of the valve body 11 via a corresponding spool 14, 15, spool chambers 28, 29, and connecting passageways 26, 27.

The outlets 22 and 23 deliver pressure flows in sequence to a manifold assembly 30 that is in fluid communication with a common outlet 35. The manifold assembly 30 is fluidly coupled to the valve body 11 via the outlets 22, 23, and at least one sealing member is provided therebetween. For example, a separate sealing member 84, such as o-rings, can be disposed between each of the outlets 22, 23 and the manifold assembly 30 for providing the fluidly sealed connection. The manifold assembly 30 can be coupled to the valve body 11 in various manners, such as by one or more fasteners 86 or the like (see FIG. 1). Still, various adhesives and/or welding can also be used. An outlet line at 33 is fluidly coupled to the common outlet 35 and can be provided with a pressure regulator at 34, valve, gauge, or the like for indicating and/or controlling pressure to an attached device, such as a soft drink carbonating device, welding device, etc. (not shown).

The manifold assembly 30 can include at least one manifold bore in fluid communication with each of the outlets 22, 23 and the common outlet 35. As shown in FIGS. 2-3, the at least one manifold bore can include a portion 86A associated generally with the outlet 22, while another portion 86B is associated generally with the outlet 23. The manifold assembly 30 can further include first and second manifold spools 31, 32 moveable within said at least one manifold bore 86A, 86B between open and closed positions for alternatively providing fluid communication between one of said outlets 22, 23 and the common outlet 35, while inhibiting fluid communication between the other of said outlets 22, 23 and the common outlet 35. The manifold spools 31, 32 can be spaced a distance apart or can abut each other, and may even be removably or non-removably coupled together by a fastener 88, adhesives, welding, etc. In addition or alternatively, the portions 86A, 86B of the at least one manifold bore can be fluidly sealed from each other by one or more sealing members 89A, 89B, such as o-rings carried by the manifold spools 31, 32.

As can be appreciated the first and second manifold spools 31, 32 can alternatively shift in response to the fluid pressure provide by either of the outlets 22, 23. For example, as shown in FIG. 2, fluid pressure provided by the end chamber 21 and outlet 23 into the manifold bore 86B can shift the manifold spool 32 (i.e., towards the left in FIG. 2) so as to permit fluid communication between the outlet 23 and the common outlet 35. The movement of the manifold spool 32 can cause similar shifting (i.e., via abutment or coupling thereto) of the other manifold spool 31 to fluidly seal between the other outlet 22 and the common outlet 35. Thus, a manifold sealing element can be provided to selectively provide or inhibit fluid communication between the end chambers 20, 21 and the common outlet 35. For example, each of the manifold spools 31, 32 can each include a manifold sealing element 90A, 90B for sealing engagement with a portion of the manifold assembly 30. The manifold sealing elements 90A, 90B can include o-rings or the like that can be maintained within annular grooves of the manifold spools 31, 32 having various geometries, including generally U-shaped or dovetail geometries. Indeed, any or all of the various o-rings of the manifold assembly 30 can have various geometries, including generally U-shaped or dovetail geometries.

The manifold sealing elements 90A, 90B can sealingly engage a portion of the manifold bore 86A, 86B. In addition or alternatively, as shown, the manifold sealing elements 90A, 90B can engage an insert 92A, 92B maintained within the manifold bore 86A, 86B that defines a sealing surface for sealing engagement with the manifold sealing elements 90A, 90B. Indeed, the insert 92A, 92B may define portions of the manifold bore 86A, 86B. The insert 92A, 92B can include a various geometries, such as a tapered geometry extending between interior portions thereof to facilitate engagement and disengagement of the manifold sealing elements 90A, 90B therewith. The inserts 92A, 92B can each include a seal member 93A, 93B disposed between an exterior portion of the insert 92A, 92B and an interior portion of the manifold bore 86A, 86B. The inserts 92A, 92B can further include one or more inlet holes 94A, 94B extending about an outer periphery thereof that are in fluid communication with an interior through passage 95A, 95B extending through the inserts 92A, 92B. The interior through passage 95A, 95B can be in fluid communication with another portion of the manifold bore, or as shown, can be in fluid communication with a manifold outlet bore 96 that is in fluid communication with the common outlet 35. Indeed, the manifold outlet bore 96 can extend between the inserts 92A, 92B and can provide fluid communication between the interior through passages 95A, 95B thereof.

Thus, alternative sealing engagement of the manifold sealing elements 90A, 90B with the interior through passage 95A, 95B of the associated inserts 92A, 92B can provide a selective fluid seal between the outlets 22, 23 and the common outlet 35 via the shifting of the manifold spools 31, 32 so as to separate and/or isolate the fluid flows. It is also to be understood that while fluid communication is provided between one of the outlets 22, 23 and the common outlet 35, the fluid seal between the other of the outlets 22, 23 and the common outlet 35 can also act as a check valve against fluid flow back into the opposite spool. For example, as shown in FIG. 2, the fluid pressure from tank 12 flows through the passageway 26 to the outlet 23 and out of the common outlet 35. However, the fluid seal between the interior through passage 95A and the outlet 22 provides a check valve to inhibit, such as prevent, reverse fluid flow back from the common outlet 35 back to the outlet 22 and the first spool 14.

The inserts 92A, 92B can be maintained within the manifold bore 86A, 86B in various manners, including fasteners, adhesives, welding, etc. For example, as shown, the inserts 92A, 92B can be maintained within the manifold bore 86A, 86B by a manifold end cap 97A, 97B that can be removably or non-removably coupled to the manifold assembly 30. In one example, the manifold end cap 97A, 97B can threadingly engage the manifold assembly 30, though various other fasteners, adhesives, and/or welding can also be used. In addition or alternatively, the manifold end cap 97A, 97B can be provided with various sealing members 98A, 98B. Thus, the manifold end cap 97A, 97B can abut a portion of the insert 92A, 92B.

In addition or alternatively, cylinder indicators 39, 40 can be provided on each end of the manifold spools 31, 32 to indicate which tank 12, 13 is in use. For example, when the manifold spool 31 is shifted to the left, as shown in FIG. 2, the first cylinder indicator 39 can protrude a distance from the body of the manifold assembly 30 to provide a visual indication that the first cylinder 12 is in use. Likewise, when the manifold spool 31 is shifted to the right (see FIG. 3), the first cylinder indicator 39 retracts and the second cylinder indicator 40 of the second manifold spool 32 similarly protrudes from the body of the manifold assembly 30, indicating that the second cylinder 13 is in use. Moreover, as shown, the manifold end caps 97A, 97B can include corresponding through holes to enable the cylinder indicators 39, 40 of the manifold spools 31, 32 to extend therefrom.

In addition or alternatively, various other indicators can also be provided. In one example, a switch 41 (e.g., a mechanical, electrical, hydraulic, pneumatic switches, or the like) can be provided for external monitoring of the system. In the shown example, an electrical switch 41 can include a resilient n actuating arm 42 for engagement with the first cylinder indicator 39 such that the switch 41 is actuated by the movement of the manifold spool 31. For example, when the first cylinder indicator 39 extends a distance from the manifold end cap 97A, the switch arm 42 can be moved to the position indicated by the solid lines. Alternatively, when the first cylinder indicator 39 retracts into the manifold end cap 97A, the switch arm 42 can resiliently return to the position indicated by the dashed lines. The switch 41 can be connected to various elements, such an external monitoring system (not shown) to allow for monitoring of which cylinder 12, 13 is currently in use. The external monitoring system can provide various audible and/or visual indicators, such as audible alarms, visual lights, etc., and/or can even be connected to a computer system or other control system. It is to be understood that the switch 41 and external monitoring system can provide local or even remote indication of which tank 12, 13 is in use, and may further include local or remote reset switches, etc. Further, either or both of the manifold spools 31, 32 can be configured for engagement with one or more switches (only one switch 41 shown).

Figure 5:
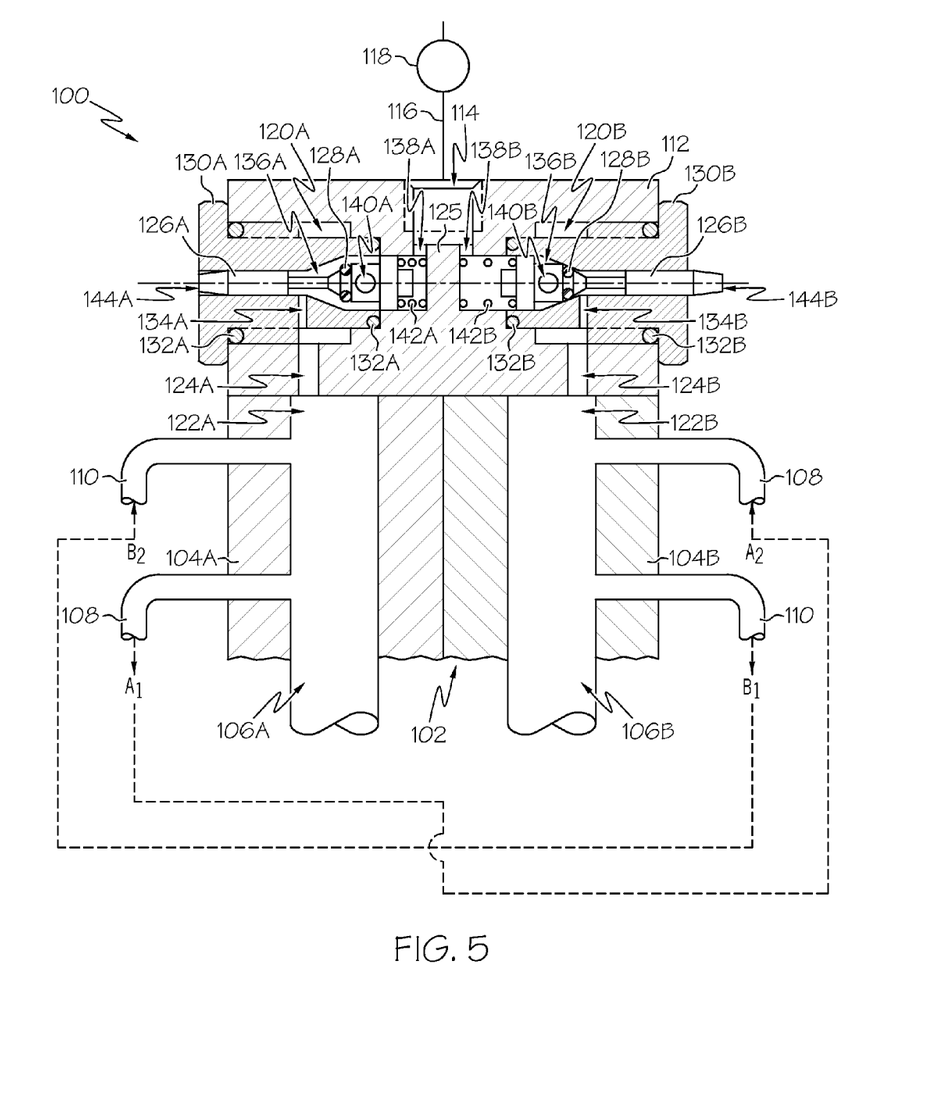
FIG. 5 is a sectional, detail view of an example valve showing another example manifold assembly.

Turning now to FIG. 5, another example manifold assembly 100 is illustrated. As before, the manifold assembly 100 is sealingly coupled to an end of the switchover valve 102 assembly. The switchover valve 102 can be generally similarly to the valve 10 previously described herein, though can also have various other and/or different structure. For example, the switchover valve 102 can be formed of a plurality of valve bodies 104A, 104B each containing a respective first and second spool chamber 106A, 106B and associated inlets, valve spools, seals, etc. (not shown). Connecting passageways can extend between and through the separate valve bodies 104A, 104B, similar to the passageways 26, 27 described previously herein, though various sealing members or the like can be used between the separate valve bodies 104A, 104B to inhibit leaks.

Alternatively, connecting passageways 108, 110 can extend between, and at least partially external of, the separate valve bodies 104A, 104B. For example, as shown in FIG. 5, the connecting passageway 108 can begin generally about arrow $A_1$ (i.e., corresponding to the secondary chamber of the spool chamber 106A), extend outside of the valve body 102, and terminate generally about arrow $A_2$ (e.g., corresponding to the end chamber of the spool chamber 106B). Similarly, the connecting passageway 110 can begin generally about arrow $B_1$, extend outside of the valve body 102, and terminate generally about arrow $B_2$. The connecting passageways 108, 110 can be coupled to the valve bodies 104A, 104B in various manners, such as by fasteners, adhesives, brazing, welding, etc., and may even include various sealing members. It is to be understood that the connecting passageways 108, 110 are separate and not in fluid communication with each other. Additional structure (not shown) can be provided to shield and protect the connecting passageways 108, 110 from damage.

The manifold assembly 100 can include a manifold body 112 that includes a common outlet 114 fluidly coupled to an outlet line 116 that can be provided with a pressure regulator 118, valve, gauge, or the like for indicating and/or controlling pressure to an attached device, such as a soft drink carbonating device, welding device, etc. (not shown). The manifold assembly 100 can also include a plurality of manifold bores 120A, 120B in fluid communication with the common outlet 114, and with a selected one of the end chambers 122A, 122B of an associated spool chamber 106A, 106B. Similarly, each of the manifold bores 120A, 120B can be in fluid communication with an associated outlet 124A, 124B corresponding to one of the end chambers 122A, 122B, as previously described herein. A separating wall 125 can inhibit, such as prevent, fluid communication between the manifold bores 120A, 120B.

The manifold assembly 100 can further include first and second manifold spools 126A, 126B that are movable within a selected one of the manifold bores 120A, 120B. In addition, each of the first and second manifold spools 126A, 126B can be resiliently biased towards a closed position (i.e., manifold spool 126B in FIG. 5), and fluid-based towards an open position (i.e., manifold spool 126A in FIG. 5). For example, each of the first and second manifold spools 126A, 126B can include a sealing member 128A, 128B, such as an o-ring, for sealing engagement with a sealing surface within the manifold bores 120A, 120B. As shown, an insert 130A, 130B can be maintained within the manifold bore 120A, 120B that defines the sealing surface for sealing engagement with the manifold sealing members 128A, 128B of the manifold spools 126A, 126B. The inserts 130A, 130B can include a various geometries, such as a tapered geometry extending between interior portions thereof to facilitate engagement and disengagement of the manifold sealing members 128A, 128B therewith. Still, a separate insert and end cap arrangement can be used similar to that of FIG. 2.

The inserts 130A, 130B can each include additional seal members 132A, 132B disposed between exterior portion(s) of the insert 130A, 130B and interior portion(s) of the manifold bore 120A, 120B. Thus, the inserts 130A, 130B can further include one or more inlet holes 134A, 134B extending about an outer periphery thereof that are in fluid communication with an interior through passage 136A, 136B extending through the inserts 130A, 130B. The interior through passage 136A, 136B can be in fluid communication with another portion of the manifold bore 120A, 120B, or as shown, can be in fluid communication with a manifold outlet bore 138A, 138B that is in fluid communication with the common outlet 114. In one example, the manifold spools 126A, 126B can each include inlet holes 140A, 140B permitting the fluid pressure to flow through a portion of the manifold spools 126A, 126B. For example, fluid pressure can flow from the inlet holes 134A, 134B and into the interior through passages 136A, 136B of the inserts 130A, 130B, around the sealing member 128A, 128B, through the inlet holes 140A, 140B of the manifold spools 126A, 126B, and out of the manifold outlet bores 138A, 138B to the common outlet 114 when a respective manifold spool 126A, 126B is in an open position (i.e., manifold spool 126A in FIG. 5).

As noted above, each of the first and second manifold spools 126A, 126B can be resiliently biased towards an open position such as by first and second spool springs 142A, 142B. The first and second spool springs 142A, 142B can include various types of springs, such as coil springs, torsion springs, spiral springs, leaf springs, etc. that can be formed of various materials, and/or can be coupled to any of the valve body 112 and the manifold spools 126A, 126B. For example, the springs 142A, 142B can act against the separating wall 125 and each of the manifold spools 126A, 126B. Each of the first and second spool springs 142A, 142B can provide sufficient force to move an associated manifold spool 126A, 126B towards the closed and sealed position independent of the fluid pressure maintained in the common outlet 114. Still, force provided by the fluid pressure from the common outlet 114 can provide an additional sealing force. Thus, the spool springs 142A, 142B can act as check valves against fluid flow back into the opposite spool. For example, when in the closed position, the fluid seal between the interior through passage 136A, 136B and the spool seal member 128A, 128B provides a check valve to inhibit, such as prevent, reverse fluid flow back from the common outlet 114 back to the outlets 124A, 124B corresponding to one of the end chambers 122A, 122B.

Additionally, each of the first and second spools 126A, 126B can also be fluid-biased towards an open position by fluid flow through the outlets 124A, 124B corresponding to one of the end chambers 122A, 122B. Thus, the manifold springs 142A, 142B can provide less force than that provided by the fluid flow of the outlets 124A, 124B corresponding to one of the end chambers 122A, 122B the spool chambers 106A, 106B.

In addition or alternatively, cylinder indicators 144A, 144B can be provided on each end of the manifold spools 126A, 126B to indicate which tank 12, 13 is in use. For example, when the manifold spools 126A, 126B are shifted to the right, as shown in FIG. 5, the cylinder indicator 144B of the opposite manifold spool 126B can protrude a distance from the body of the manifold assembly 100 (i.e., such as from through holes of the insert 130B) to provide a visual indication that the first cylinder 12 is in use. In addition or alternatively, various other indicators can also be provided, such as a switch or the like as discussed above (i.e., switch 41 and associated elements). It is to be understood that this indication scheme is opposite to that previously described herein, in that the cylinder indicator 144B of the opposite side protrudes. Still, either alone or in combination with additional structure (i.e., switches or the like), an indication of which tank 12, 13 is in use can still be provided.

Figure 6:
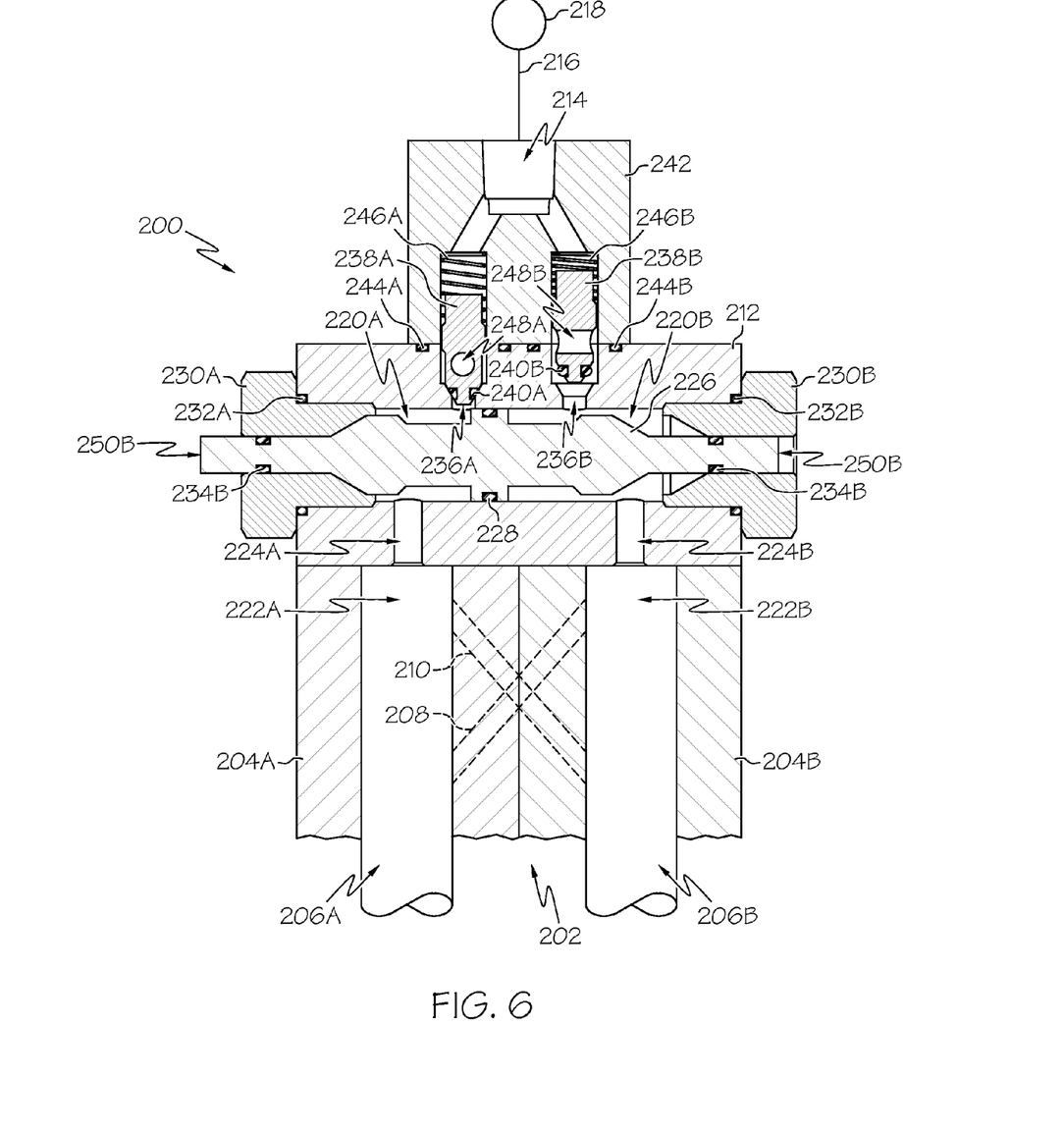
FIG. 6 is similar to FIG. 5, but shows another example manifold assembly.

Turning now to FIG. 6, another example manifold assembly 200 is illustrated. As before, the manifold assembly 200 is sealingly coupled to an end of the switchover valve 202 assembly. The switchover valve 202 can be generally similarly to the valves 10, 102 previously described herein, though can also have various other and/or different structure. In one example, the switchover valve 202 can be formed of a plurality of valve bodies 204A, 204B each containing a respective first and second spool chamber 206A, 206B and associated inlets, valve spools, seals, etc. (not shown). Connecting passageways 208, 210 can extend between and through the separate valve bodies 104A, 104B, similar to the passageways 26, 27 described previously herein, though various sealing members or the like (not shown) can be used between the separate valve bodies 104A, 104B to inhibit leaks. Still, external passageways (not shown) that are similar those previously discussed in FIG. 5 (i.e., 108, 110) can also be used.

The manifold assembly 200 can include a manifold body 212 that includes a common outlet 214 fluidly coupled to an outlet line 216 that can be provided with a pressure regulator 218, valve, gauge, or the like for indicating and/or controlling pressure to an attached device, such as a soft drink carbonating device, welding device, etc. (not shown). The manifold assembly 200 can also include at lease one manifold bore including portions 220A, 220B in fluid communication with the common outlet 214, and the end chambers 222A, 222B of associated spool chambers 206A, 206B. Similarly, the manifold bore 220A, 220B can be in fluid communication with the associated outlets 224A, 224B corresponding to the end chambers 222A, 222B, as previously described herein.

The manifold assembly 200 can further include at least one manifold spool 226 moveable within the at least one manifold bore 220A, 220B between open and closed positions for alternatively providing fluid communication between one of said end chambers 222A, 222B and the common outlet 214 while inhibiting fluid communication between the other of said end chambers 222A, 222B and the common outlet 214. The manifold spool 226 can include at least one sealing member 228 for sealing engagement with an interior portion of the manifold bore 220A, 220B. Indeed, the manifold bore can be one generally continuous bore, and the sealing member 228 can provide fluid separation between portions of the manifold bore 220A, 220B. The sealing member 228 can include an o-ring formed of various resilient materials that can be maintained within an annular o-ring seat defined between a pair of shoulders coupled to or formed with the manifold spool 226. The annular o-ring seat can have various geometries, such as generally U-shaped or dovetail geometries.

In addition or alternatively, an insert 230A, 230B can be maintained within the manifold bore 220A, 220B for receiving a portion of the manifold spool 226. The inserts 230A, 230B can include various geometries, such as a tapered geometry extending between interior portions thereof to facilitate engagement (i.e., sealing or non-sealing engagement) with the manifold spool 226. The inserts 230A, 230B can each include additional seal members 232A, 232B disposed between exterior portion(s) of the insert 230A, 230B and interior portion(s) of the manifold bore 220A, 220B. Similarly, the manifold spool 226 can also include additional sealing members 234A, 234B for sealing engagement with portions of the inserts 230A, 230B, though it is to be understood that sealing members can also (or even alternatively) be carried by the inserts 230A, 230B.

Further, each portion of the manifold bore 220A, 220B can include a manifold outlet bore 236A, 236B in fluid communication with the common outlet 214. Thus, as shown in FIG. 6, fluid pressure from the first spool chamber 206A can proceed through the passageway 208 to the end chamber 222B of the second spool chamber 206B. The fluid pressure can then flow through the associated outlet 224B and into the associated portion of the manifold bore 220B. The manifold spool 226 shifts towards the left, as shown in FIG. 6, such that the sealing member 228 permits fluid flow to the associated manifold outlet bore 236B while inhibiting, such as preventing, fluid flow to the other manifold outlet bore 236A. The pressurized fluid flow can then proceed to the common outlet 214. Upon a switch from one supply tank 12 to another tank 13 (see FIG. 2), the manifold spool 226 can move within the manifold bores 226A, 226B to permit fluid communication to the other manifold outlet bore 236A.

In addition or alternatively, one or more check valves can be provided in fluid communication with the manifold outlet bores 236A, 236B. For example, each of the manifold outlet bores 236A, 236B can directly feed a check valve 238A, 238B each including a sealing member 240A, 240B, such as an o-ring or the like. The check valves 238A, 238B can be disposed at least partially within the manifold body 212, and/or can be disposed at least partially within a check valve body 242 sealingly coupled to the manifold body 212 in various manners. For example, sealing members 244A, 244B, such as o-rings, can be disposed between the check valve body 242 and the manifold body 212 generally about each of the manifold outlet bores 236A, 236B. When in an open position, the pressurized fluid can flow around, or even through, the check valves 238A, 238B. For example, the check valves 238A, 238B can be provided with one or more through holes 248A, 248B or the like that can extend through various portions thereof. The check valves 238A, 238B can be independently resiliently biased to a closed position, such as by a check valve spring 246A, 246B or the like. Various types of springs can be used, as discussed herein. Each of the check valve springs 246A, 246B can provide sufficient force to move an associated check valve 238A, 238B towards the closed and sealed position independent of the fluid pressure maintained in the common outlet 214. Still, force provided by the fluid pressure from the common outlet 214 can provide an additional sealing force.

Each of the manifold outlet bores 236A, 236B each communicate fluid pressure to a check valve 238A, 238B, which in turn are each in fluid communication with the common outlet 214. Thus, the check valves 238A, 238B can inhibit, such as prevent, fluid flow back into the opposite spool from the common outlet 214. For example, when in the closed position, the fluid seal between the check valve 238A, 238B and the manifold outlet bores 236A, 236B provides a check valve to inhibit, such as prevent, reverse fluid flow back from the common outlet 214 back to the outlets 224A, 224B corresponding to one of the end chambers 222A, 222B.

In addition or alternatively, cylinder indicators 250A, 250B can be provided on each end of the manifold spool 226 to indicate which tank 12, 13 is in use. For example, when the manifold spool 226 is shifted to the left, as shown in FIG. 6, the cylinder indicator 250A can protrude a distance from the body of the manifold assembly 212 (i.e., such as from through holes of the insert 230A) to provide a visual indication that the first cylinder 12 associated with first spool chamber 206A is in use. In addition or alternatively, various other indicators can also be provided, such as a switch or the like as discussed above (i.e., switch 41 and associated elements). Thus, either alone or in combination with additional structure (i.e., switches or the like), an indication of which tank 12, 13 is in use can be provided.

In addition or alternatively, the automatic switchover valves of the instant application can include various other features. In one example, as shown in FIG. 1, first and second pressure indicators 300, 302 can be provided each in fluid communication with a respective one of said first and second spools 14, 15. For example, the first and second pressure indicators 300, 302 can each be in fluid communication with the first and second inlets 24, 25 of the valve 10 so as to provide a pressure indication of each of the first and second tanks 12, 13, respectively. Either or both of the pressure indicators 300, 302 could also be coupled to a computerized monitoring system or the like. The pressure of each tank 12, 13 can then be displayed independent of tank usage. In another example, various indicia plates or labels 306, 308 can be provided to various elements. In yet another example, various mounting brackets or the like (not shown) can be provided for the various elements.

In still yet another example, turning to FIGS. 1-2, the automatic switchover valves can include spring holders 310A, 310B removably coupled to the valve body 11 for maintaining the first and second spool springs 16, 17 therein. For example, the spring holders 310A, 310B can be threadingly engaged with the valve body 11. The spring holders 310A, 310B may even define a portion of the spring chambers 18, 19. Additionally, each of the spring holders 310A, 310B can include a bleed port 312A, 312B associated with each of said spool chambers 28, 29 for inhibiting, such as preventing, pressure lock within the spring chambers 18, 19. As can be appreciated, each of the spring holders 310A, 310B can be associated with a selected one of the spool chambers 28, 29. Thus, the spool springs 16, 17 maintained within the spring holders 310A, 310B can be replaced when it is desired to modify the pressure at which the switchover occurs between the spool chambers 28, 29 and the associated tanks 12, 13, as various applications can utilize different switchover pressures. For example, various switchover pressures can include 100 PSI, 200 PSI, 350 PSI, or even 500 PSI, though various additional switchover pressures are also contemplated. Thus, one switchover valve 10 can be utilized in different environments requiring different switchover pressures by changing out the spool springs 16, 17 via the removable spring holders 310A, 310B. Moreover, if desired, each of the first and second spool chambers 28, 29 can have different switchover pressures by utilizing different spool springs 16, 17 each providing different biasing forces.

Figure 4B:
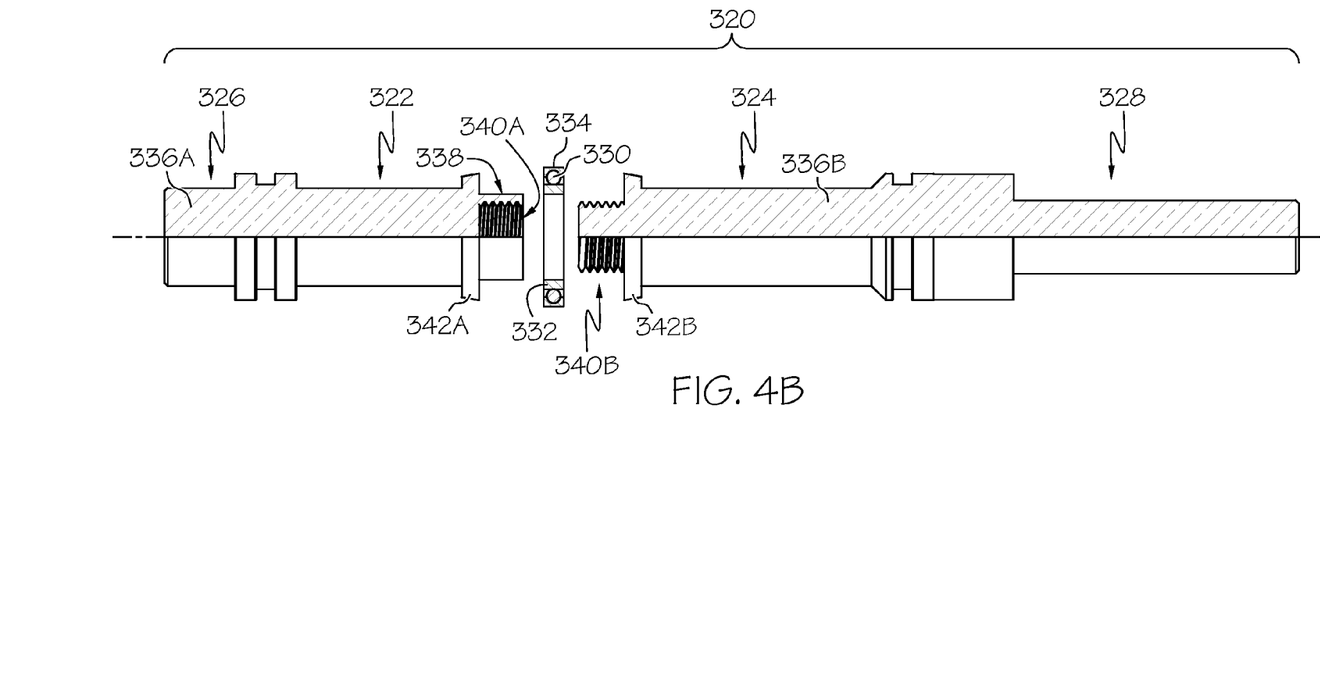
FIG. 4B is similar to FIG. 4A, but shows another example spool.

In still yet even another example, turning now to FIG. 4B, an alternate first (and/or second) spool 320 is illustrated. As before, the first spool 320 can be provided with a first annular groove 322 adjacent to a second annular groove 324 to direct gas pressure from an inlet port 14-15 to a connecting passageway or tube 26, 27. A third annular groove 326 can be provided generally towards one end of the spool 320 so as to correspond generally with the end chamber 20 for providing fluid flow therein, and a fourth annular groove 328 can be provided generally towards another end of the spool 320 so as to correspond generally with the spring chamber 18 for providing fluid flow therein. As before, the various annular grooves can be separated from each other by sealing members, such as o-rings, that can be maintained within annular o-ring seats having generally U-shaped or dovetail geometries. Still, where relatively high pressures are utilized, one or more of the o-rings can be reinforced to inhibit deformation and/or tearing thereof during use. For example, as shown, an o-ring 330 can be carried on a carrier ring 332, and can be reinforced with an outer reinforcement member 334, such as a Teflon retainer, cap, or the like. Thus, the combination of the o-ring 330 and the outer reinforcement member 334 can be configured for selective sealing engagement with a portion of said first spool chamber 28.

The carrier ring 332 can include a generally rigid material, such as metal. Thus, the first spool 320 can be split into multiple segments, such as first and second segments 336A, 336B. The carrier ring 332 can be disposed upon a portion 338 of the first segment 336A. Additionally, the first and second segments 336A, 336B can be coupled together in various manners, such as by threaded engagement of corresponding structure 340A, 340B, which permits removal and/or replacement of the reinforced sealing member 330. Still, the first and second segments 336A, 336B can be coupled together in various other removable, or even non-removable, manners, including various fasteners, adhesives, welding, etc. The first and second segments 336A, 336B can be coupled together such that the reinforced sealing member 330 can be maintained between a pair of shoulders 342A, 342B coupled to or formed with the spool segments 336A, 336B. Similarly, the third and fourth annular grooves 326, 328 can utilize various sealing members, including various o-rings as described herein, or even reinforced o-rings (which may utilize various other split spool segments and corresponding structure).

In operation, with the spools positioned as in FIG. 2, a pressurized gas flow from the first cylinder 12 enters the first inlet port 24 and is directed by the first and second annular grooves 50A, 52A in the first valve spool 14 through the first tube 26 to the end chamber 21 of the second spool 15. The second spool 15 is accordingly pushed towards the closed position against the action of the second spring 17 to allow a generally unrestricted pressure flow out of the second outlet 23, through the repositioned manifold spool 32 and ultimately to the outlet line 33. The other repositioned manifold spool 31 can act as a check valve. Also, when the second spool 15 is pushed towards the closed position, the second inlet port 25 is inhibited, such as prevented, from communicating with the second tube 27.

As the gas pressure in the first cylinder 12 diminishes, the pressure in the second end chamber 21 will fall below the value necessary to compress the second spring 17 (i.e., the spring force corresponding to the switchover pressure) and the second spring 17 will shift the second spool 15 towards the open position (i.e., spring biased), as shown in FIG. 3. Gas pressure from the second cylinder 13 in the second inlet port 25 will now be directed by the first and second annular grooves 50B, 52B in the second spool 15 through the second tube 27 to end chamber 20 of first spool 14. The first spool 14 is accordingly shifted towards the closed position (i.e., fluid biased) in which its secondary annular groove 52A is closed and inhibited, such as prevented, from communicating with the first tube 26 by the sealing member 54A. The manifold spools 31, 32 will shift towards the opposite direction by the gas pressure provided by the first outlet 22 to permit gas pressure to be communicated from the first outlet 22 to the outlet line 33. The manifold spool 32 will now act as a check valve. Operation of the various other manifold assemblies 100, 200 can similarly proceed as described previously herein.

While the valve spools 14, 15 are moving towards their fully open positions, gas pressure can be evacuated from the end chambers 20, 21. For this purpose, exhaust vents or bores 37, 38 serve to exhaust gas pressure from the 20, 21 end chambers via the corresponding tube 26, 27 (see FIG. 2).

It is to be understood that any of the various valves 10, 102, 202 and associated structure can be utilized with any of the various manifold assemblies 30, 100, 200 described herein. Additionally, various other static or dynamic sealing members can be utilized in place of the o-rings described herein, including various other gaskets, seals, membranes, etc. having various states, such as solids, liquids, gasses, etc., and can be coupled to portions of the valve body 11 and/or manifold 30, etc.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A valve for automatic switchover from a plurality of fluid pressure sources to a common outlet, including:
   a valve body including first and second inlet ports in fluid communication with first and second spool chambers, respectively, wherein each of said first and second inlet ports are adapted for fluid communication with respective fluid pressure sources, and each of said first and second spool chambers include an end chamber, and each of said first and second spool chambers include a primary chamber, a secondary chamber;
   first and second spools respectively in said first and second spool chambers and each including at least one sealing member carried thereon for selective sealing engagement with a portion of said first and second spool chambers, respectively, wherein each of said first and second spools are resiliently biased towards an open position, and fluid-biased towards a closed position;
   fluid passageways extending through said valve body receiving spool controlled fluid pressures and each terminating at the end chamber of said first and second spool chambers, wherein in an open position, each of said first and second spools are adapted to provide delivery of pressurized fluid from an associated one of the inlet ports to the end chamber of the opposite spool chamber, and further wherein in a closed position, each of said first and second spools are adapted via the at least one sealing member to inhibit delivery of pressurized fluid from an associated one of the inlet ports to the end chamber of the opposite spool chamber; and a manifold assembly including at least one manifold bore in fluid communication with each of the end chambers and the common outlet, said manifold assembly including first and second manifold spools moveable within said at least one manifold bore between open and closed positions for alternatively providing fluid communication between one of said end chambers and the common outlet while inhibiting fluid communication between the other of said end chambers and the common outlet, wherein the first and second manifold spools are movable in response to the fluid pressure provided from an associated one of the end chambers, and wherein at least one of said first and second manifold spools includes an indicator portion movable together with said at least one of said first and second manifold spools and adapted to selectively extend a distance out of the manifold assembly to be visible from outside of the manifold assembly, wherein an interior surface of each of said spool chambers includes a tapered geometry extending between said primary and secondary chambers providing an increased cross-sectional area generally about the first and second inlet ports to facilitate sealing engagement of the sealing member with said portion of the spool chamber.

2. The valve of claim 1, wherein the at least one sealing member carried on the first and second spools is an o-ring.

3. The valve of claim 1, further including a spring holder removably coupled to the valve body.

4. The valve of claim 1, further including first and second pressure indicators each in fluid communication with a respective one of said first and second spools.

5. The valve of claim 1, wherein the manifold assembly includes a plurality of manifold bores each in fluid communication with the common outlet and with a selected one of the end chambers.

6. The valve of claim 5, wherein each of said first and second manifold spools are moveable within a selected one of the plurality of manifold bores, and wherein each of said first and second manifold spools are resiliently biased towards the closed position, and fluid-biased towards the open position.

7. The valve of claim 1, wherein both of said first and second manifold spools include an indicator portion, and each indicator portion is adapted to independently extend a distance out of the manifold assembly.

8. The valve of claim 1, wherein said indicator portion is movable relative to an actuator of a switch and adapted to selectively and physically engage the actuator of the switch.

9. The valve of claim 1, wherein at least one of said first and second manifold spools includes a manifold sealing member and the manifold assembly includes an insert defining a sealing surface for sealing engagement with said manifold sealing member.

10. A valve for automatic switchover from a plurality of fluid pressure sources to a common outlet, including:

a valve body including first and second inlet ports in fluid communication with first and second spool chambers, respectively, wherein each of said first and second inlet ports are adapted for fluid communication with respective fluid pressure sources, and each of said first and second spool chambers include a primary chamber, a secondary chamber, and an end chamber;

first and second spools respectively in said first and second spool chambers and each including at least one sealing member carried thereon for selective sealing engagement with a portion of said first and second spool chambers to selectively inhibit fluid communication between said primary and secondary chambers, respectively, wherein each of said first and second spools are resiliently biased towards an open position wherein said primary chamber is in fluid communication with said secondary chamber, and fluid-biased towards a closed position wherein said primary chamber is inhibited from fluid communication with said secondary chamber via said at least one sealing member;

fluid passageways extending through said valve body receiving spool controlled fluid pressures, the fluid passageways each beginning at the secondary chamber one of said first and second spool chambers and terminating at the end chamber of the opposite spool chamber, wherein in an open position, each of said first and second spools are adapted to provide delivery of pressurized fluid from an associated one of the inlet ports to the end chamber of the opposite spool chamber, and further wherein in a closed position, each of said first and second spools are adapted via the at least one sealing member to inhibit delivery of pressurized fluid from an associated one of the inlet ports to the end chamber of the opposite spool chamber; and a manifold assembly including at least one manifold bore in fluid communication with each of the end chambers and the common outlet, said manifold assembly including first and second manifold spools moveable within said at least one manifold bore between open and closed positions for alternatively providing fluid communication between one of said end chambers and the common outlet while inhibiting fluid communication between the other of said end chambers and the common outlet wherein the first and second manifold spools are movable in response to the fluid pressure provided from an associated one of the end chambers, and wherein at least one of said first and second manifold spools includes an indicator portion movable together with said at least one of said first and second manifold spools and adapted to selectively extend a distance out of the manifold assembly to be visible from outside of the manifold assembly, wherein an interior surface of each of said spool chambers includes a tapered geometry extending between said primary and secondary chambers providing an increased cross-sectional area generally about the first and second inlet ports to facilitate sealing engagement of the sealing member with said portion of the spool chamber.

11. The valve of claim 10, wherein the at least one sealing member carried on the first and second spools is an o-ring.

12. The valve of claim 11, wherein each of said first and second spools includes an annular o-ring seat with a dovetail geometry for receiving said o-ring.

13. The valve of claim 10, further including a plurality of spring holders removably coupled to the valve body, each of said spring holders being associated with a selected one of the spool chambers.

14. The valve of claim 10, wherein the manifold assembly includes a plurality of manifold bores each in fluid communication with the common outlet and with a selected one of the end chambers, wherein each of said first and second manifold spools are moveable within a selected one of the plurality of manifold bores, and wherein each of said first and second manifold spools are resiliently biased towards the closed position, and fluid-biased towards the open position.

15. The valve of claim 10, wherein both of said first and second manifold spools include an indicator portion, and each indicator portion is adapted to independently extend a distance out of the manifold assembly.

16. The valve of claim 10, wherein each of said first and second manifold spools includes an o-ring and the manifold assembly includes first and second inserts defining sealing surfaces for sealing engagement with said o-rings, respectively.

17. A valve for automatic switchover from a plurality of fluid pressure sources to a common outlet, including:
   a valve body including first and second inlet ports in fluid communication with first and second spool chambers, respectively, wherein each of said first and second inlet ports are adapted for fluid communication with respective fluid pressure sources, and each of said first and second spool chambers include a primary chamber, a secondary chamber, and an end chamber;
   first and second spools respectively in said first and second spool chambers and each including a plurality of sealing members carried thereon, at least one of the plurality of sealing members selectively inhibiting fluid communication between said first chambers and said secondary chambers, and at least another of the plurality of sealing members selectively inhibiting fluid communication between said primary chambers and said end chambers, respectively, wherein each of said first and second spools are resiliently biased towards an open position, and fluid-biased towards a closed position;
   fluid passageways receiving spool controlled fluid pressures, the fluid passageways each beginning at the secondary chamber of one of said first and second spool chambers and terminating at the end chamber of the opposite spool chamber,
   wherein in an open position, each of said first and second spools are adapted to provide delivery of pressurized fluid from an associated one of the inlet ports to the end chamber of the opposite spool chamber, and further wherein in a closed position, each of said first and second spools are adapted via said at least one of the plurality of sealing members to inhibit delivery of pressurized fluid from an associated one of the inlet ports to the end chamber of the opposite spool chamber; and
   a manifold assembly including at least one manifold bore in fluid communication with each of the end chambers and the common outlet, said manifold assembly including at least one manifold spool moveable within said at least one manifold bore between open and closed positions for alternatively providing fluid communication between one of said end chambers and the common outlet while inhibiting fluid communication between the other of said end chambers and the common outlet
   wherein the at least one manifold spool is movable in response to the fluid pressure provided from one of the end chambers, and
   wherein the at least one manifold spool includes an indicator portion movable together with the at least one manifold spool, located at an end of the at least one manifold spool, and adapted to selectively extend a distance out of the manifold assembly to be visible from outside of the manifold assembly,
   wherein an interior surface of each of said spool chambers includes a tapered geometry extending between said primary and secondary chambers providing an increased cross-sectional area generally about the first and second inlet ports to facilitate sealing engagement of the sealing member with said portion of the spool chamber.

18. The valve of claim 17, wherein the plurality of sealing members carried on the first and second spools are o-rings, and wherein each of said spool chambers includes a tapered geometry extending between said primary and secondary chambers to facilitate sealing engagement of said one of the plurality of sealing members with said portion of the spool chamber.

19. The valve of claim 17, wherein the fluid passageways extend through said valve body.

20. The valve of claim 17, wherein each of said spool chambers further include a spring chamber separated from said secondary chamber by one of the plurality of sealing members, the valve further including a plurality of spring holders removably coupled to the valve body and each defining at least a portion of one of the spring chambers, the valve body further including a bleed port associated with each of said spool chambers for inhibiting pressure lock within said spring chambers.

21. The valve of claim 17, wherein said at least one manifold spool includes first and second manifold spools each including an indicator portion movable together with the associated first and second manifold spools, and each indicator portion is adapted to independently extend a distance out of the manifold assembly.

* * * * *